United States Patent [19]

Newton

[11] Patent Number: 5,855,984
[45] Date of Patent: Jan. 5, 1999

[54] COMPOSITE ARTICLE AND METHOD FOR MANUFACTURING THE SAME

[75] Inventor: John R. Newton, Cumbria, England

[73] Assignee: 3-D Composites Limited, United Kingdom

[21] Appl. No.: 578,647

[22] PCT Filed: Jul. 7, 1994

[86] PCT No.: PCT/GB94/01475

§ 371 Date: Mar. 22, 1996

§ 102(e) Date: Mar. 22, 1996

[87] PCT Pub. No.: WO95/01868

PCT Pub. Date: Jan. 19, 1995

[30] Foreign Application Priority Data

Jan. 10, 1993 [GB] United Kingdom .................... 9314311

[51] Int. Cl.⁶ ........................................................ B32B 3/12
[52] U.S. Cl. .......................... 428/118; 264/257; 264/261; 264/271.1; 264/279.1; 428/116

[58] Field of Search ...................................... 428/116, 118; 264/257, 261, 271.1, 275, 277, 279, 279.1

[56] References Cited

U.S. PATENT DOCUMENTS 4,090,002  5/1978  Rosenblum ................................ 428/36

FOREIGN PATENT DOCUMENTS 2376739  9/1978  France .

*Primary Examiner*—Jeffrey T. Smith
*Assistant Examiner*—D. Aylward
*Attorney, Agent, or Firm*—Kohn & Associates

[57] ABSTRACT

A method for molding a composite article by injecting a plastics material resin into the fibers within a mold by a continuous web of fibers that is laid in a mold in such fashion that a honeycomb structure is produced without the web crossing itself.

10 Claims, 2 Drawing Sheets

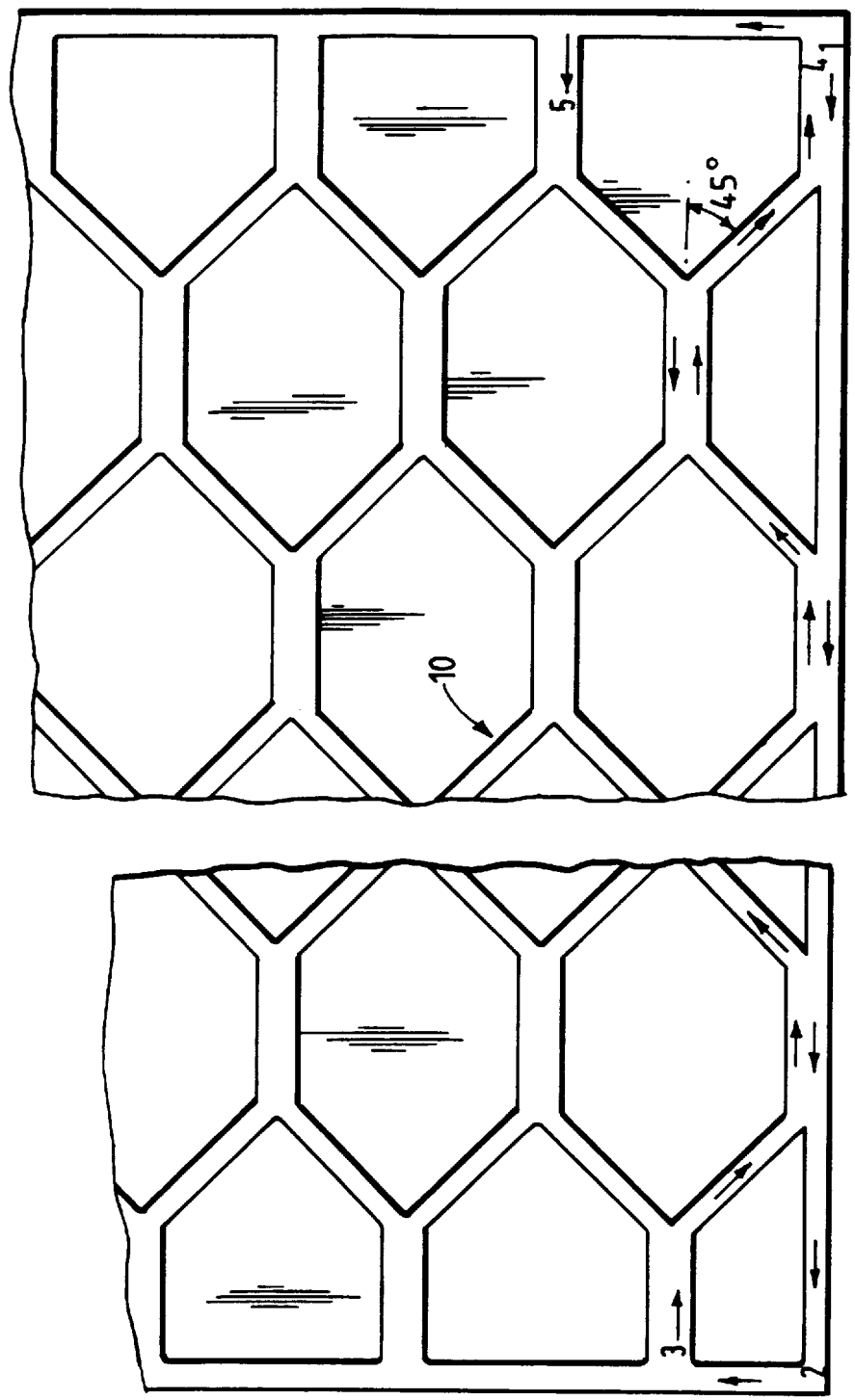

COMPOSITE ARTICLE AND METHOD FOR MANUFACTURING THE SAME

This invention relates to a composite article and a method of moulding composite articles from fibre reinforced synthetic curable resins.

The composite access covers described in our European patent number 0147050 have an internal structure which is very efficient and leads to high load bearing qualities for the weight of material used. The design of this structure is based on the concept of employing two plates which are separated by webs. A structure of this type provides a high value of second moment of area, in relation to the quantity of material used, and the greater this value the stiffer the structure will be and the greater its load bearing capacity. Within the structure the reinforcing fibres are arranged in an optimised manner. That is, the fibres are arranged so as to correspond with the direction of the anticipated stresses which will occur within the structure when subjected to load.

Our European patent numbers 0365579 and 0408639 describe methods which enable the complex three dimensional structure of these access covers to be injected with a matrix resin in a very effective and speedy manner even when high fibre volume fractions are employed. In order to obtain the necessary strength to weight ratio in load bearing composite articles of this type, it is necessary to employ very high fibre volume fractions. The access covers referred to above have fibre volume fractions ranging from 43–50%. Normally such high fibre volume fractions are very difficult to inject in commercially acceptable moulding times, which limited the size of composite article which could be moulded prior to the process of our above mentioned European patents.

Access covers and other load bearing composite articles made as described above are excellent high load bearing structures capable of competing with the hitherto used alternatives fabricated from metal. However, when the load requirements are less severe, for example an access cover for pedestrian areas, it is desirable to reduce the cost of production. A significant proportion of the expense in the structures referred to above is contributed by the polyurethane foam cores used to create the three dimensional structure. It would therefore be an advantage, in respect of medium duty structures, to eliminate the polyurethane cores while still retaining the structural benefits of a high fibre volume fraction.

The invention seeks to provide a composite article, and method of making the same, improved in the above respects.

According to the present invention there is provided a method of moulding a composite article by injecting a plastics material resin into fibres within a mould characterised in that a continuous web of fibres is laid in a mould in such a fashion that a honeycomb structure is produced without the web crossing itself.

The term "honeycomb" is used herein to refer to spaces being enclosed by the web where it touches itself but should not be construed as being limited to such spaces being hexagonal or even being regular in nature.

The invention extends to a composite article produced by the method described above.

In a preferred form of the method of the invention the honeycomb is laminated to a plate during moulding by providing a flat sheet of fibres contiguous with the honeycomb structure and injecting the whole simultaneously. If desired, a honeycomb structure can be provided on either side of the plate. Alternatively, if required, a plate may be provided on either side of the honeycomb structure but in this case it is necessary to use foam inserts to prevent seepage of the resin into the interstices of the honeycomb and in this case the cost advantage over the structure described in European patent number 0 147 050 is not as great. Nevertheless there are certain circumstances in which such a structure is desirable and it remains within the ambit of the present invention.

The fibrous web forming the honeycomb is, as referred to above, preferably continuous throughout the article being moulded. Discontinuities in the web lead to weak spots in the moulded structure. In order for the web to be continuous, the way in which it is placed in the mould needs to be thought out carefully as described more fully hereinafter. The web may contain substantially parallel fibres (in its longitudinal direction) or may, preferably, be a laminate of mainly longitudinal fibres with some fibres arranged at a angle to the longitudinal direction in order to cater for the direction of stress likely to be found in the finished composite. A particularly preferred construction comprises 70% of longitudinal fibres together with 15% of fibres arranged at +45° to the longitudinal direction and 15% of fibres arranged at –45° to the longitudinal direction. Other configurations are of course possible.

The composite article of the invention may be used as a simple grating or, when integral with a sheet, may be used as a structural component, e.g. a floor panel, where medium to high load bearing is required (but not the very high load bearing capacity needed by access covers e.g. the ability to bear the weight of a petrol tanker). With the preferred embodiments of the invention not requiring the use of polyurethane foam core inserts, the composite article of the invention can be produced more cheaply for these medium to high load bearing requirements.

A BRIEF DESCRIPTION OF THE DRAWINGS

The invention will be described further, by way of example, with reference to the accompanying drawings, in which:

FIG. 3 is a plan view of the web showing the direction in which it is laid in order to build up the honeycomb.

Figure 1:
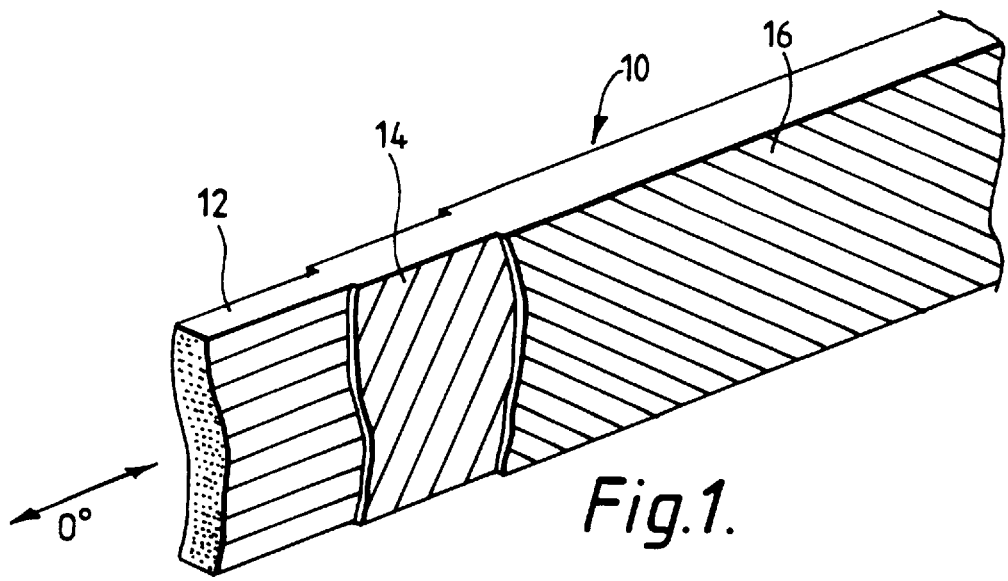
FIG. 1 is a partial perspective view of a fibrous web for use in the method and article of the invention.

Referring to the drawings, the first stage in the production of a composite article in accordance with the invention is to produce a tape of structural fibres which will form the web 10. The tape is preferably formed from continuous fibres, the majority being crimp free, and the fibres are arranged in a configuration commensurate with providing the required strength properties for the reinforcing web. In FIG. 1 a web 10 is shown in which the majority (70%) of the fibres 12 are arranged substantially longitudinally of the web 10. 15% of the fibres 14 are arranged at an angle of –45° to the longitudinal direction and a further 15% of the fibres 16 and arranged at an angle of +45° to the longitudinal direction. The tape is held together by stitching using, for example, a polyester thread. The 45° fibres 14,16 specifically provide resistance to sheer forces within the web while the longitudinal fibres 12 provide strength along the length of the web. The density of fibres in the web is arranged so as to provide a high fibre volume fraction, which is designed to match that of the plate portion of the laminate (if used) thus ensuring balanced mechanical properties and consistent flow properties during injection of the matrix resin.

The web 10 is laid into one half of a mould having indentations in the desired honeycomb pattern (not shown)

in a manner that produces the desired configuration while avoiding the need for any discontinuity of the web structure or any crossing over of the web.

Referring to FIG. 3, this is achieved as follows. Starting at point 1 the tape is laid into the mould by advancing to points 2, 3, 4 and then 5. The arrows in FIG. 3 indicate the path of the web. This pattern is repeated until the complete honeycomb has been laid, at which point the tape is cut.

If the composite article is to include an integrally laminated plate 17 (FIG. 2), a flat fibre sheet which will form the top (or bottom) plate of the structure is laid into the mould on top of the web 10. The fibres at the edges of the web are in direct contact with the fibres of the plate laminate and are compressed by closure of the mould to the same fibre volume fraction. The fibres within the plate laminate, like the web, would also be arranged to distribute and support the load according to the end use of the particular structure.

The mould having been closed, the structure is then injected with a matrix resin to form a one-piece composite article. Preferably, injection would be by one of the methods of network injection moulding referred to in our above mentioned European patents thus achieving high flow rates during the injection cycle and the potential for rapid cure and hence short cycle times. As described in those patents, a number of matrix resins can be employed but polyester resins are usually preferred.

Figure 2:
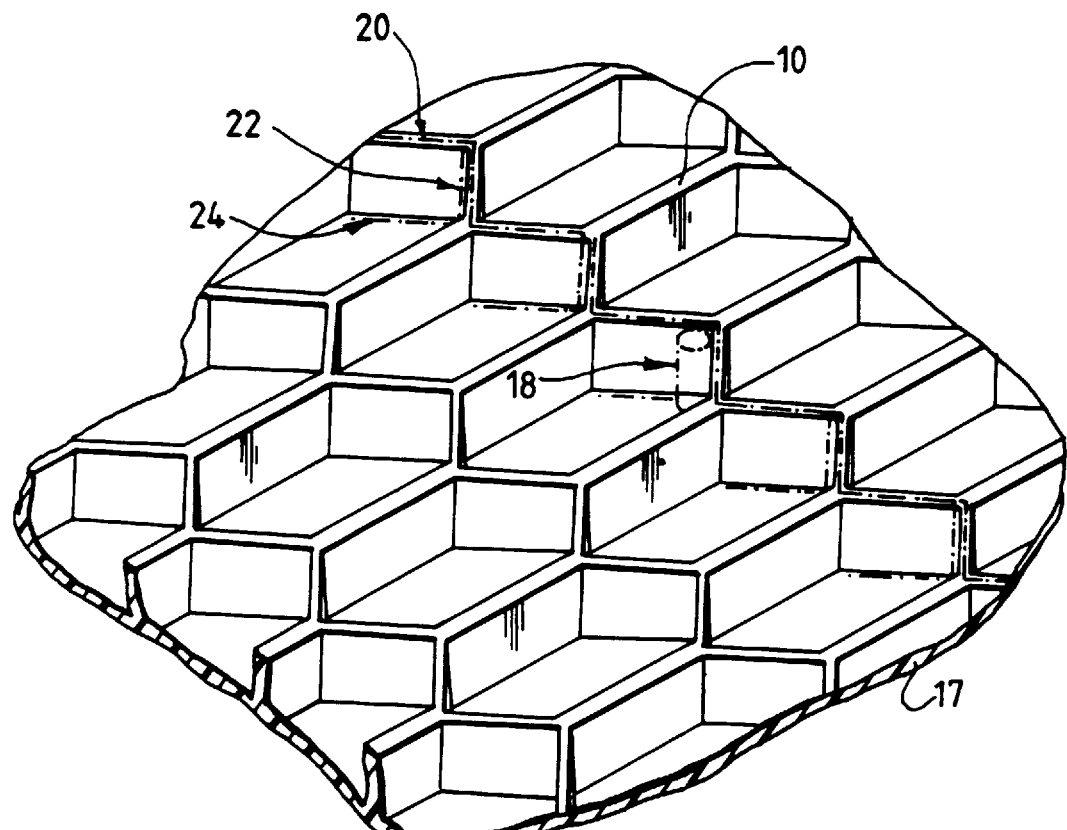
FIG. 2 is a partial perspective view of the web in the form of a honeycomb.

An example of the injection system is as follows. Referring to FIG. 2, resin is injected into a port 18 in the mould from where it is distributed across the composite via a gallery 20 in the mould. It also is simultaneously distributed down galleries 22 in the web structure to a lower gallery 24 in the bottom mould half. In this way, the resin is injected rapidly across the width of the mould at both the top and bottom of the web 10. From there the resin diffuses through the web 10 to either side until it has completely wetted the entire web 10 leaving no dry spots. After this, injection is halted and the resin cured, allowing the article then to be de-moulded. The galleries 20 and 24 in the mould should be in accordance with our European patent number 0408639 in that they should be of such a size and orientation that no substantial deformation of the fibres into the galleries occurs. One way of achieving this is to have a bridge piece in the upper mould half which pushes the glass fibres down and leaves a void forming the required gallery.

As mentioned above the composite article can be varied in various ways. For example a web could be provided on both sides of the plate 17, or the web could be made as a component in its own right and would make an excellent grating. The tape forming the web 10 could be woven as a honeycomb structure, rather than laid up as such a structure, although the final fibre architecture would remain as described above. The web 10 could be assembled between two plates by incorporating polyurethane foam inserts to form a structure comparable with the access cover of our above mentioned European patent number 0147050. The cost advantage in this case is less but it may nevertheless be useful for certain end uses. Naturally the composite article of the invention can be incorporated into and be part of a larger structure.

The fibres used will be fibres conventionally employed to produce structural composite articles and may include, without limitation, glass, Kevlar, carbon and the like.

The invention provides a method and article having an excellent load bearing configuration. Moreover, using an orientated continuous fibre architecture with a high value of fibre volume fraction (typically greater than 40%), leads to high load bearing capabilities. Additionally, especially if one of our above mentioned network injection moulding processes is employed, the manufacture is very efficient and even large structures can be produced within commercially acceptable moulding times.

I claim:

1. A method of moulding a composite article by injecting a plastics material resin into fibres within a mould characterised in that a continuous web of fibres is laid in a mould in such a fashion that a honeycomb structure is produced without the web crossing itself.

2. A method as claimed in claim 1 in which the honeycomb is laminated to a plate during moulding by providing a flat sheet of fibres contiguous with the honeycomb structure and injecting the whole simultaneously.

3. A method as claimed in claim 2 in which a honeycomb structure is provided on either side of the plate.

4. A method as claimed in any of claims 1 to 3 in which the fibrous web forming the honeycomb is continuous throughout the article being moulded.

5. A method as claimed in any of claims 1 to 3 in which the web contains substantially parallel fibres in its longitudinal direction.

6. A method as claimed in any of claims 1 to 3 in which the web is a laminate of mainly longitudinal fibres with some fibres arranged at a angle to the longitudinal direction in order to cater for the direction of stress likely to be found in the finished composite.

7. A method as claimed in claim 6 in which the web comprises 70% of longitudinal fibres together with 15% of fibres arranged at +45° to the longitudinal direction and 15% of fibres arranged at −45° to the longitudinal direction.

8. A composite article produced by a method as claimed in claim 1.

9. An article as claimed in claim 8 used as a simple grating.

10. An article as claimed in claim 8 having an integral sheet and used as a structural component, e.g. a floor panel.

* * * * *